(12) United States Patent
Sahasrabudhe et al.

(10) Patent No.: US 8,256,625 B2
(45) Date of Patent: Sep. 4, 2012

(54) WATER FILTRATION SYSTEM

(75) Inventors: Ratnakar Sahasrabudhe, Louisville, KY (US); Samuel Vincent DuPlessis, Louisville, KY (US); Markus Dantinne, Denmark, WI (US); Terry Zerger, Howards Grove, WI (US)

(73) Assignee: General Electric Company, Schenectady, NY (US)

( * ) Notice: Subject to any disclaimer, the term of this patent is extended or adjusted under 35 U.S.C. 154(b) by 895 days.

(21) Appl. No.: 11/290,021

(22) Filed: Nov. 30, 2005

(65) Prior Publication Data

US 2007/0119773 A1    May 31, 2007

(51) Int. Cl.
*B01D 35/28* (2006.01)
(52) U.S. Cl. .......... 210/450; 210/455; 210/443
(58) Field of Classification Search .......... 210/455, 210/450, 443
See application file for complete search history.

(56) References Cited

U.S. PATENT DOCUMENTS

| | | | | |
|---|---|---|---|---|
| 3,262,570 A | * | 7/1966 | Borsetti et al. | 210/266 |
| 3,289,847 A | * | 12/1966 | Rothemund | 210/266 |
| 3,415,382 A | * | 12/1968 | Martin | 210/282 |
| 4,693,820 A | * | 9/1987 | Baxter | 210/232 |
| 4,728,421 A | * | 3/1988 | Moddemeyer | 210/232 |
| 5,484,529 A | | 1/1996 | Malugade et al. | |
| D388,500 S | | 12/1997 | Burchard et al. | |
| 5,699,832 A | | 12/1997 | Burchard et al. | |
| 5,707,518 A | | 1/1998 | Coates et al. | |
| 5,715,699 A | | 2/1998 | Coates et al. | |
| 5,744,033 A | | 4/1998 | Bertrand et al. | |
| 5,753,117 A | * | 5/1998 | Jiang | 210/232 |
| 5,823,229 A | | 10/1998 | Bertrand et al. | |
| 5,891,334 A | | 4/1999 | Gundrum et al. | |
| 6,007,718 A | * | 12/1999 | Booth | 210/232 |
| 6,342,155 B1 | * | 1/2002 | Kuo | 210/195.1 |
| 6,379,560 B1 | * | 4/2002 | Tilp et al. | 210/748 |
| 6,632,355 B2 | * | 10/2003 | Fritze | 210/232 |
| 6,649,056 B2 | * | 11/2003 | Fritze | 210/315 |
| 2001/0040120 A1 | * | 11/2001 | Jousset et al. | 210/85 |
| 2003/0019819 A1 | * | 1/2003 | Fritze | 210/767 |
| 2003/0141235 A1 | * | 7/2003 | Stankowski et al. | 210/232 |

OTHER PUBLICATIONS

Water Encyclopedia, article entitled "Ion Exchange and Inorganic Adsorption" by K. Kadirvelu and Jyotsna Goel, ed. Jay Lehr et al., pub. John Wiley & Sons, Inc., Hoboken, New Jersey, 2005, vol. 4, p. 494, Table 4, first two entries.*

Water Encyclopedia, article entitled "Activated Carbon, Ion Exchange and Adsorption Properties," by B. Saha, pub. John Wiley & Sons, Inc., Hoboken, New Jersey, 2005, p. 79-84.*

* cited by examiner

*Primary Examiner* — Walter D Griffin
*Assistant Examiner* — Denise R Anderson
(74) *Attorney, Agent, or Firm* — Global Patent Operation; Douglas D. Zhang

(57) ABSTRACT

A filter cartridge includes a top end cap and a bottom end cap spaced apart from one another. A filter media is disposed between the top and bottom end caps. An outlet channel is within the filter media and extends between the top end cap and the bottom end cap. The outlet channel includes an open top end proximate the top end cap and a closed bottom end proximate the bottom end cap.

15 Claims, 6 Drawing Sheets

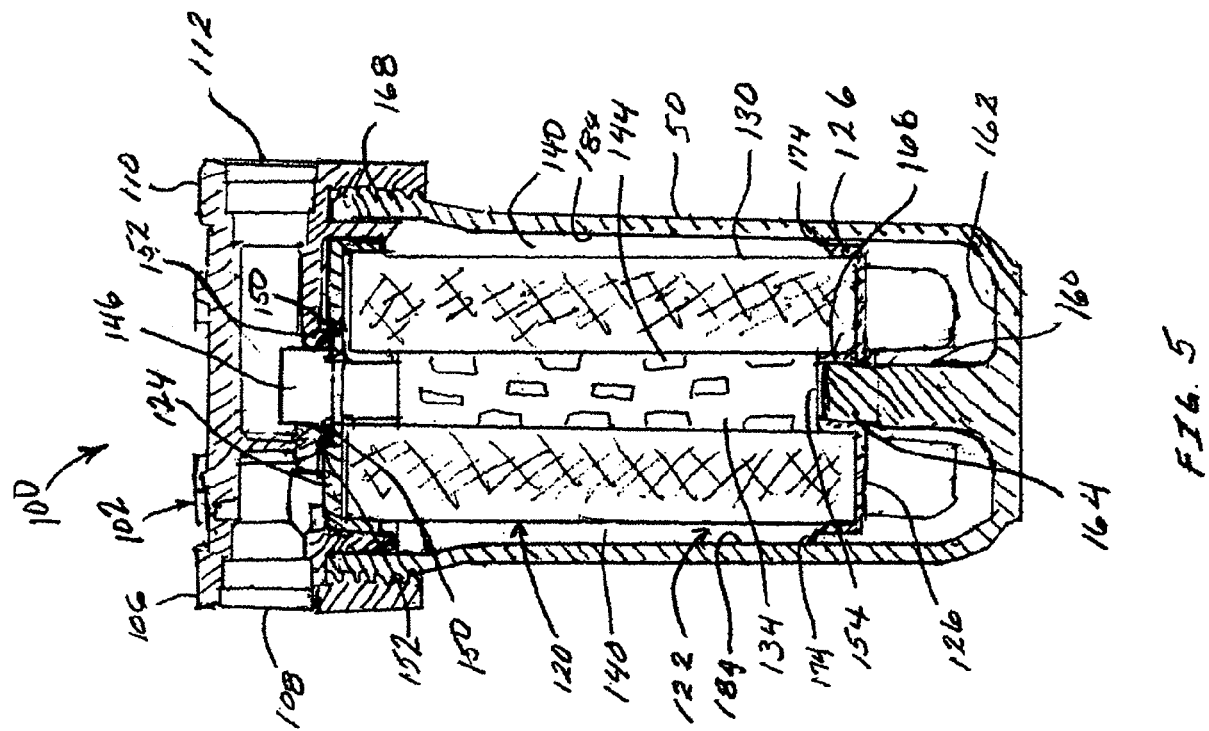

WATER FILTRATION SYSTEM

BACKGROUND OF THE INVENTION

This invention relates generally to water treatment systems, and, more particularly, to in-home water filtration systems.

Water treatment devices are generally used to treat water in a home or building for human consumption. At least some other known water treatment devices include a water softener assembly for removing hardness minerals from the water. At least some known water treatment devices include a filter for filtering particles or sediment from the water. In addition, at least some known water treatment devices include taste and odor filters for reducing chlorine or odor causing material from the water. At least some other known water treatment devices include mercury and lead filters for removing mercury and lead from the water. Moreover, in at least some filtration systems, a common filter head and sump is used with multiple filter media designed particular filtration objectives. Furthermore, at least some other known water treatment devices include disinfection devices for removing, killing or inactivating microorganisms such as bacteria, virus, cysts, protozoa, and the like from the water.

However, consumers typically purchase specific individual components to assemble an array of water treatment devices that are specific to water quality concerns of consumers. Each individual component in the array, functions independently from the other components, thus increasing the difficulty of maintaining the overall water treatment system in the consumers home or building. Additionally, consumers may also perform certain maintenance functions such as the timely replacement of filter media. The performance of the filtration systems may be compromised if the filter media are not properly installed.

BRIEF DESCRIPTION OF THE INVENTION

In one aspect, a filter cartridge for use in a fluid filtration system including a sump coupled to a filter head is provided. The filter cartridge includes a top end cap and a bottom end cap spaced apart from one another. A filter media is disposed between the top and bottom end caps. An outlet channel is within the filter media and extends between the top end cap and the bottom end cap. The outlet channel includes an open top end proximate the top end cap and a closed bottom end proximate the bottom end cap.

In another aspect, a filter cartridge for use in a fluid filtration system including a sump coupled to a filter head includes a top end cap and a bottom end cap spaced apart from one another. A filter media is disposed between the top and bottom end caps. A keying receptacle is on the bottom end cap. The keying receptacle is configured to receive a keying element on the sump.

In yet another aspect, a water filtration assembly configured for attachment to a filter head is provided. The filtration assembly includes a sump configured for attachment to the filter head and a filter cartridge receivable in the sump. The filter cartridge includes a top end cap and a bottom end cap spaced apart from one another. A filter media is disposed between the top and bottom end caps. A filter outlet channel is within the filter media. The filter outlet channel includes an open top end proximate the top end cap and a closed bottom end proximate the bottom end cap.

BRIEF DESCRIPTION OF THE DRAWINGS

FIG. 4 is a perspective view of an exemplary filter assembly.

FIG. 5 is a cross sectional view of the filter assembly shown on FIG. 4 taken along the line 5-5.

DETAILED DESCRIPTION OF THE INVENTION

Figure 1:
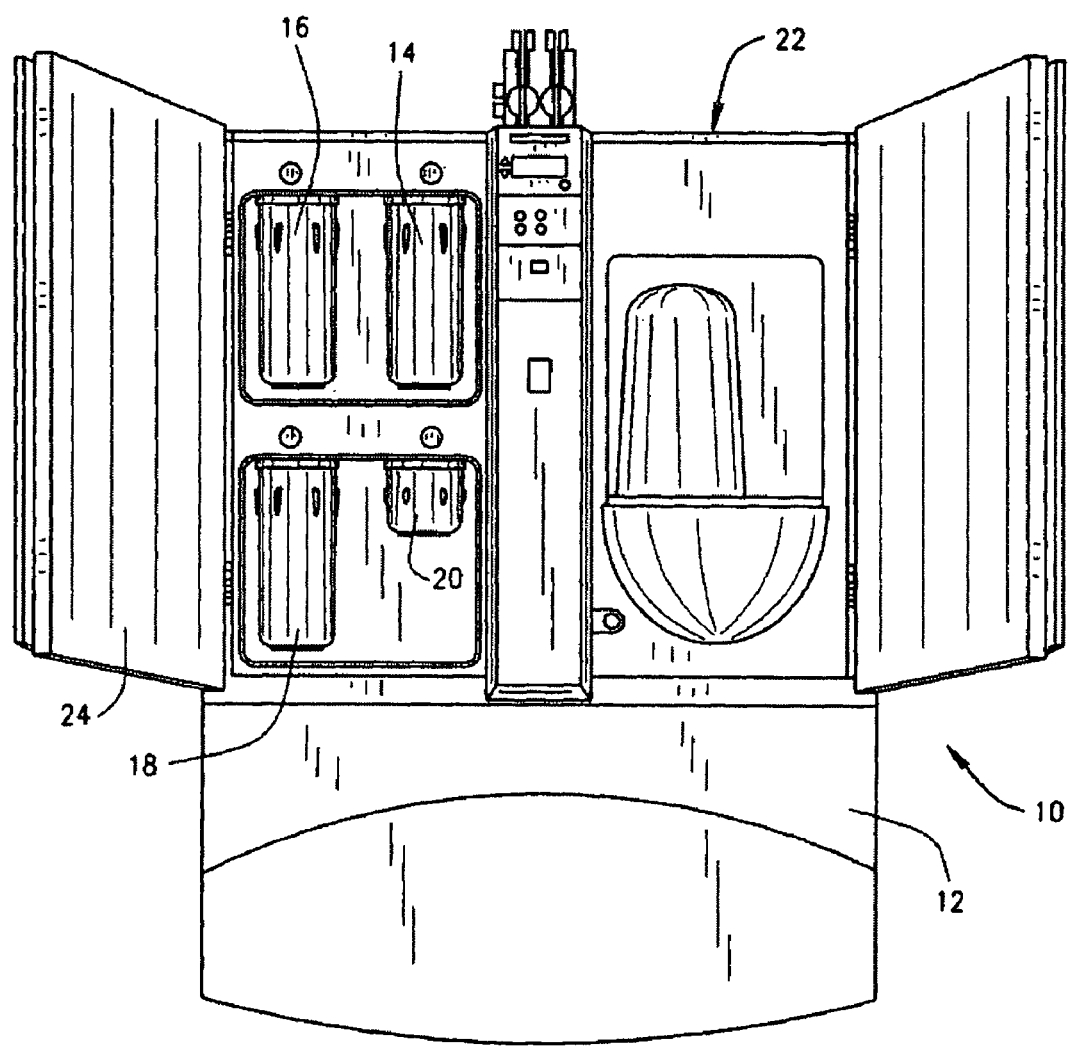
FIG. 1 is a front view of an exemplary water treatment assembly.

FIG. 1 is a front view of an exemplary water treatment assembly 10. Water treatment assembly 10 includes a housing or cabinet 12 enclosing a plurality of water treatment elements, or modules, therein. In the exemplary embodiment, water treatment assembly 10 includes a particle filter module 14 including at least one particle or sediment filter (not shown) for gross particle reduction. Assembly 10 also includes a taste and odor removal module 16 including a taste and odor filter (not shown) and a lead and mercury removal module 18 including at least one lead and mercury filter (not shown). In an alternative embodiment, water treatment assembly 10 includes less than all, or a combination of, modules 14, 16 and 18. In the exemplary embodiment, assembly 10 includes at least one additional modular compartment 20 to facilitate housing additional filter modules depending on the users particular water quality needs. Modular compartment 20 includes a by-pass sump and may be upgraded with a module similar to the other modules previously described. Alternatively, water treatment assembly 10 includes multiple modular compartments 20 that may be upgraded at a later date or in response to a determined water quality after installation of assembly 10. In the exemplary embodiment, assembly 10 includes a water softener sub-assembly 22.

Assembly 10 includes doors 24 hingedly mounted to housing 12. Doors 24 allow access to the plurality of water treatment elements. In the exemplary embodiment, doors 24 include a latch to retain doors 24 in a closed position. It is to be understood that the present invention is applicable, not only to water treatment assemblies which form a stand alone device, such as water treatment assembly 10, but to other forms of water treatment assemblies as well, such as, but not limited to, central water treatment systems. Therefore, water treatment assembly 10 is provided by way of illustration rather than limitation, and accordingly there is no intention to limit application of the present invention to any particular water treatment assembly, such as water treatment assembly 10.

Figure 2:
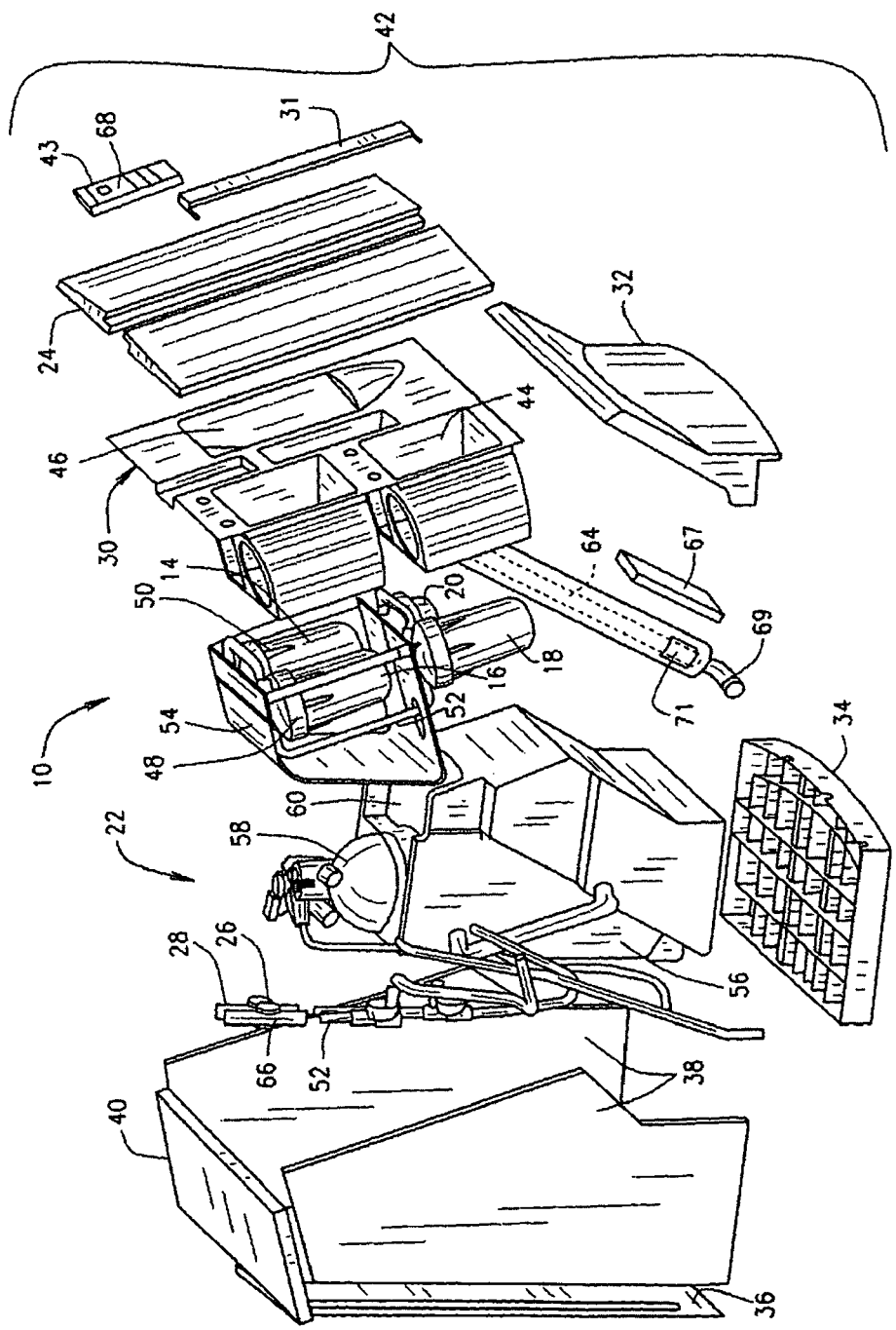
FIG. 2 is an exploded view of the water treatment assembly shown in FIG. 1.

FIG. 2 is an exploded view of water treatment assembly 10. In the exemplary embodiment, water treatment assembly 10 includes a main inlet 26 and a main outlet 28. Water is channeled through assembly 10 from main inlet 26, through the plurality of water treatment elements, and eventually to main outlet 28. Water is supplied to main inlet 26 from plumbing lines (not shown) in the user's home or building. The water supplied to main inlet 26 is typically below a useable quality desired by the user. Specifically, the water supplied to main inlet 26 may include particles, minerals, bacteria, and the like. Water treatment assembly 10 facilitates removing these undesirable elements to increase the quality of water consumed by the user. The water exiting assembly 10 at main outlet 28 is generally of a higher quality than the water entering assembly 10 at main inlet 26.

Housing 12 includes a front panel 30, a cabinet front 32, a base 34, a back wall 36 connected between two side walls 38, and a top cover 40. Top cover 40 may include two cover pieces for separately accessing and/or servicing the various components, such as, for example, water softener sub-assembly 22 or modular compartments 14, 16, 18 and 20. Base 34 supports the water treatment elements thereon. Doors 24 are hingedly coupled to side walls 38. Alternatively, doors 24 are slidably coupled to side walls 38 or front panel 30. Optionally, doors 24 may be locked in the closed position. Front panel 30 cooperates with cabinet front 32 to form a front portion 42 of housing 12. In the exemplary embodiment, front panel 30 is removable for accessing the various water treatment elements of assembly 10. In the exemplary embodiment, front panel 30 includes a display 43 for displaying information to the user, such as information relating to the operational status of the various components or water treatment elements. Display 43 includes a keypad or touch screen (not shown) such that a user may interface with display 43 and thus assembly 10.

Upper and lower filter compartments 44 extend from front panel 30 and house modules 14, 16, 18 and 20. Filter compartments 44 are accessible through door 24 and are sized and oriented to allow unobstructed access to filter modules 14, 16, 18 and 20 for repair or replacement. Specifically, filter modules 14, 16, 18 and 20 are removable from filter compartments 44 without requiring that filter modules 14, 16, 18 and 20 be tilted. However, water spilled from filter modules 14, 16, 18 and 20 is caught in a catch basin of compartments 44. A water softener sub-assembly access door 46 is also positioned within front panel 30. Access door 46 is rotatably mounted to front panel 30. In another embodiment, access door 46 is slidably mounted to front panel 30. Alternatively, no access door 46 is provided. Optionally, front panel 30 includes a disinfection module access door 31 for accessing disinfection module 62 for repair and replacement of disinfection module 62.

In the exemplary embodiment, each filter module 14, 16, 18 and 20 includes a filter support 48 for supporting a respective filter sump 50. The respective filters (not shown) are positioned within each filter sump 50. Additionally, each filter module 14, 16, 18 and 20 includes a water inlet (not shown) and a water outlet (not shown). Each filter module 14, 16, 18 and 20 is coupled in flow communication with one another, and main inlet and outlet 26 and 28, respectively, by a plurality of plumbing lines 52. In the exemplary embodiment, each filter module 14, 16, 18 and 20 is coupled to a filter bracket 54 which facilitates supporting and/or aligning each filter module 14, 16, 18 and 20 within compartments 44. Filter bracket 54 is coupled to top cover 40. In an alternative embodiment, each filter module 14, 16, 18 and 20 is coupled to front panel 30.

Water softener sub-assembly 22 includes a brine tank 56, and a resin tank 58 positioned in brine tank 56. Resin tank 58 is coupled in flow communication with filter modules 14, 16, and 18, and/or other water treatment assembly elements, by plumbing lines 52. Moreover, brine tank 56 is coupled in flow communication with resin tank 58 such that brine tank 56 regenerates resin tank 58 during a regenerating cycle. In the exemplary embodiment, brine tank 56 includes an opening 60 positioned adjacent access door 46. Salt may be added to brine tank 56 through opening 60 and access door 46.

Water treatment assembly 10 includes a disinfection module 62 which facilitates disinfecting the water flowing through water treatment assembly 10. Specifically, disinfection module 62 substantially eliminates microbiological contaminants such as bacteria, virus, cysts and protozoa in the water. Disinfection module 62 is coupled in flow communication with the various water treatment elements by plumbing lines 52. Disinfection module 62 is accessible through access panel 31 to facilitate removal or repair of disinfection module 62. In the exemplary embodiment, disinfection module 62 is an ultraviolet reactor and includes an ultraviolet lamp or bulb 64 emitting ultraviolet light to inactivate or kill microorganisms. In an alternative embodiment, disinfection module 62 includes a filter element (not shown) that mechanically filters the microbial contaminants.

In operation, a by-product of the light produced by bulb 64 is heat. The amount of heat in the water, and thus the temperature of the water is a function of the reactor temperature, the ambient temperature, the temperature of the incoming water, and the flow rate of the water through the reactor. The amount of heat produced in the water may be monitored by measuring the temperature of the water within or exiting the reactor and/or the temperature of the reactor surface and correlating that temperature to a temperature of the water contained within the reactor.

Water treatment assembly 10 is controlled by a controller 68 which, in one aspect, operates based on the amount of heat in the water. In the exemplary embodiment, disinfection module 62 includes a control switch 65 for controlling an operation state of bulb 64. For example, control switch 65 is coupled to controller 68, and controller 68 limits or restricts power to bulb 64. As such, the risk of exposure to a user is substantially reduced, if not eliminated. In the exemplary embodiment, control switch 65 is coupled to doors 24 or access panel 31. Alternatively, control switch 65 is coupled directly to disinfection module 62, such that manipulation of disinfection module 62, for example, during cleaning or maintenance, would restrict power to UV bulb or lamp 64.

In the exemplary embodiment, controller 68 also operates based on signals generated by a sensor representative of a water temperature in water treatment assembly 10. Controller 68 controls a cooling system or process using a control algorithm, such that the water delivered to an end-user is at an acceptable temperature. The cooling system includes a cooling device 67, such as a fan, which cools the reactor surface, thus extracting heat from the water. Controller 68 facilitates reducing the temperature of the water in the reactor when the temperature is above a warm set point by operating the cooling system while bulb 64 is on and disinfection module 62 is operating. Additionally, when the temperature is above a hot set point, or maximum allowable temperature, controller 68 turns lamp 64 off and operates the cooling system to reduce the temperature of the water in the reactor. In another embodiment, the cooling system includes a flush valve 69, such as, for example, a micro-electro-mechanical system (MEMS) valve. When the temperature of the water is above a threshold, controller 68 opens flush valve 69. A predetermined volume of water is flushed from the reactor, thus replacing the water in the reactor with cooler water. The volume of water may be controlled by opening the valve for a predetermined amount of time, or by measuring the volume of water flushed. Controller 68 operates the cooling system to restrict the flow of water having a temperature above a threshold amount to an end-user. The cooling system operates the flush valve based upon time and/or temperature inputs. For example, controller 68 includes a timer. The control algorithm checks the timer. Once the predetermined time has elapsed, flush valve 69 is opened for n seconds. The timer is reset, and the process is repeated. Additionally, when the temperature of the water or the reactor are above a predetermined amount, flush valve 69 is opened for a certain time or to flush a certain volume of water, and the timer may then be reset. The cooling system also includes a thermal shut-off device 71 coupled to lamp 64. In operation, when the temperature of the water or the temperature of lamp 64 is at a predetermined level, shut-off device 71 reduces or ceases power to lamp 64 and the water is cooled to another predetermined temperature.

In the exemplary embodiment, water treatment assembly 10 includes a by-pass valve 66. By-pass valve 66 facilitates channeling water from main inlet 26 to main outlet 28 to by-pass each of the plurality of water treatment elements. In another embodiment, by-pass valve 66 facilitates bypassing water softener sub-assembly 22 such that water only flows through filter modules 14, 16, 18 and 20. In the exemplary embodiment, water softener sub-assembly 22 is bypassed to flush filter modules 14, 16, 18 and 20 after a filter change. In another embodiment, by-pass valve 66 facilitates bypassing filter modules 14, 16, 18 and 20 and channels water to water softener sub-assembly 22, such that water softener sub-assembly 22 may undergo a regeneration process. In the exemplary embodiment, by-pass valve 66 is an electromechanical valve which is automatically activated. Alternatively, by-pass valve 66 is activated mechanically by a user.

Controller 68 is operatively coupled to main inlet 26, main outlet 28, and by-pass valve 66. Controller 68 facilitates controlling the flow of water through water treatment assembly 10. In the exemplary embodiment, controller 68 is coupled to filter modules 14, 16, 18 and 20, water softener sub-assembly 22, and/or disinfection module 62 for controlling and/or monitoring the flow of water therethrough. In the exemplary embodiment, controller 68 is also coupled to a plurality of sensors (not shown in FIG. 2) that monitor the flow of water through water treatment assembly 10, and generate signals relating to water characteristics. For example, the sensors monitor the flow rate, pressure, or temperature of the water through assembly 10. The sensors monitor the water quality of the water channeled through assembly 10, such as by measuring water turbidity. The sensors may also monitor other characteristics of the water flowing through assembly 10. Signals are transmitted to controller 68 relating to such water characteristics, and the flow of water or the operation of the water treatment elements of assembly 10 may be controlled by controller 68.

In the exemplary embodiment, controller 68 is additionally coupled to display 43. Controller 68 sends signals to and/or receives signals from display 43 relating to the operational status of water treatment assembly 10. Alternatively, a user interacts with and/or controls water treatment assembly 10 via a wireless communication, such as, for example, via a wireless communication device or via the internet, or the like, which facilitates remotely monitoring assembly 10.

In the exemplary embodiment, water treatment assembly 10 includes housing 12, particle filter module 14, taste and odor removal module 16, lead and mercury removal module 18, one modular compartment 20, disinfection module 62, and water softener sub-assembly 22. In another embodiment, water treatment assembly 10 includes housing 12, particle filter module 14, taste and odor removal module 16, lead and mercury removal module 18, one modular compartment 20, and water softener sub-assembly 22. In yet another embodiment, water treatment assembly 10 includes housing 12, particle filter module 14, taste and odor removal module 16, two modular compartments 20, and water softener sub-assembly 22. However, other embodiments including other combinations of water treatment assembly components are possible.

Figure 3:
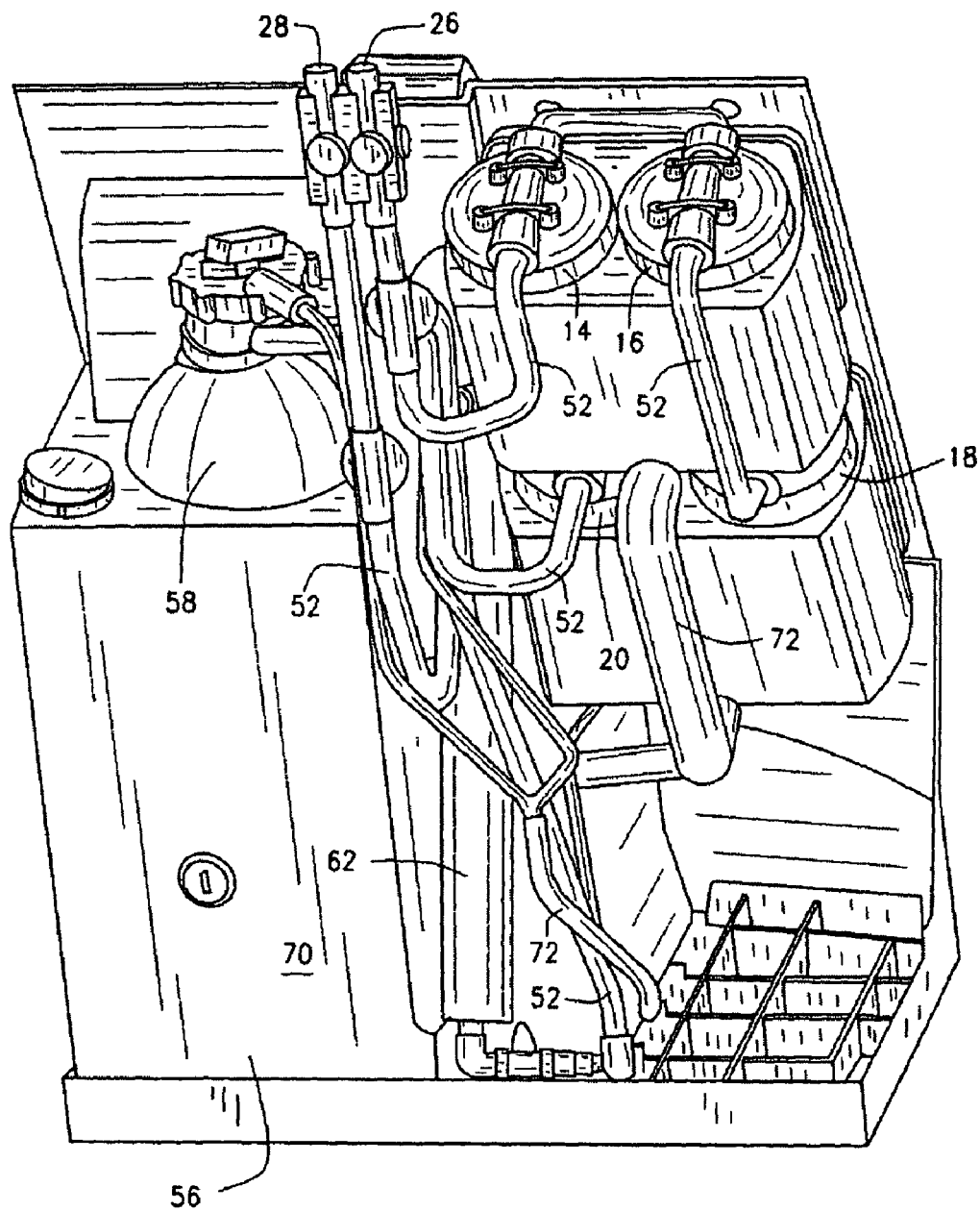
FIG. 3 is a perspective view of the water treatment assembly shown in FIG. 1 without a back wall and side walls.

FIG. 3 is a perspective view of a rear portion 70 of water treatment assembly 10. FIG. 3 illustrates an exemplary configuration of water treatment assembly 10 having main inlet 26, filter modules 14, 16, and 18, by-pass sump 20, water softener sub-assembly 22, disinfection module 62, and main outlet 28 arranged in series and coupled to one another by plumbing lines 52.

In the exemplary embodiment, particle filter module 14 is in flow communication with and positioned downstream of main inlet 26. Taste and odor removal module 16 is in flow communication with and positioned downstream of particle filter module 14. Lead and mercury removal module 18 is in flow communication with and positioned downstream of taste and odor removal module 16. Each module 14, 16 and 18 facilitates removing contaminants from the water prior to channeling water to water softener sub-assembly 22.

With particular emphasis on filter modules 14, 16, and 18, water treatment assembly 10 includes drain lines 72 extending from upper and lower filter compartments 44 to brine tank 56. Drain lines 72 facilitate draining water from respective compartments 44 to brine tank 56, such as, for example, water spilled from filter sumps 50 during a filter change. Drain lines 72 are coupled to brine tank 56 at a position above a water level of brine tank 56 during normal operating conditions, such that water does not flow from brine tank 56 into compartments 44.

FIG. 4 illustrates a perspective view of an exemplary filter assembly 100 that may be used in water treatment assembly 10 and includes sump 50. Filter assembly 100 may be configured for particulate removal, taste and odor improvement, or lead and mercury removal. In addition to sump 50, filter assembly 100 includes a filter head 102. Filter head 102 includes an inlet 106 having an inlet channel 108 and an outlet 110 having an outlet channel 112. Water channeled to filter assembly 100 enters filter assembly 100 through inlet channel 108. Filtered water exits filter assembly 100 via outlet channel 112.

FIG. 5 illustrates a cross sectional view of filter assembly 100. A filter cartridge 120 is held in a filter cartridge chamber 122 within sump 50. Filter cartridge 120 is substantially cylindrical in shape and includes a top end cap 124 and a bottom end cap 126 spaced apart from one another. A filter media 130 is disposed between top end cap 124 and bottom end cap 126. Filter media 130 is configured to perform one of particulate or sediment removal, taste and odor improvements or lead and mercury removal. A filter outlet channel 134 is within filter media 130 and extends between top end cap 124 and bottom end cap 126.

Water entering filter assembly 100 through inlet channel 108 is channeled into a space 140 between an inner surface of sump 50 and an outer perimeter of filter cartridge 120. Water moves through filter media 130 to flow into filter outlet channel 134. In an exemplary embodiment, filter outlet channel 134 is provided with a plurality of openings 144 that facilitate the flow of water into filter outlet channel 134. Filter outlet channel 134 is in flow communication with outlet channel 112 of filter assembly 100 through an open top end 146 proximate top end cap 124. Filtered water is channeled from filter outlet channel 134 through top end cap opening 146 to outlet channel 112 and out of filter assembly 100. Top end cap 124 includes a circumferential seal 150 that engages a sealing flange 152 on filter head 102. Seal 150 facilitates preventing unfiltered water from entering outlet channel 112. Filter outlet channel 134 includes a closed bottom end 154 proximate bottom end cap 126. More specifically, bottom end cap 126 closes bottom end 154 of filter outlet channel 134. Because bottom end 154 of filter outlet channel 134 is closed, bottom end cap 126 does not need a seal to block the entry of unfiltered water into the bottom end 154 of filter outlet channel 134.

Sump 50 includes a stand pipe 160 that is substantially centered in a bottom 162 of sump 50. Stand pipe 160 includes a keying element 164 formed thereon that is received in a keying receptacle 166 formed in end cap 126. Keying element 162 is provided to facilitate locating filter cartridge 120 in sump 50. Moreover, keying element 162 and keying receptacle 166 cooperate to facilitate insuring that a correct filter cartridge 120 is inserted in sump 50. When an incorrect filter cartridge is attempted to be installed in sump 50, the sump threads on sump 50 do not sufficiently engage threads on filter head 102 so that sump 50 cannot be coupled to filter head 102 in a manner that allows filter cartridge 120 to seat in sump 50 and to seal against filter head 102. In the exemplary embodiment, filter assembly 100 is mounted such that filter head 102 is held in a fixed position and sump 50 is separated from filter head 102 by manipulation of sump 50. In the illustrated embodiment, sump 50 is coupled to filter head 102 by a threaded connection 168.

Figure 6:
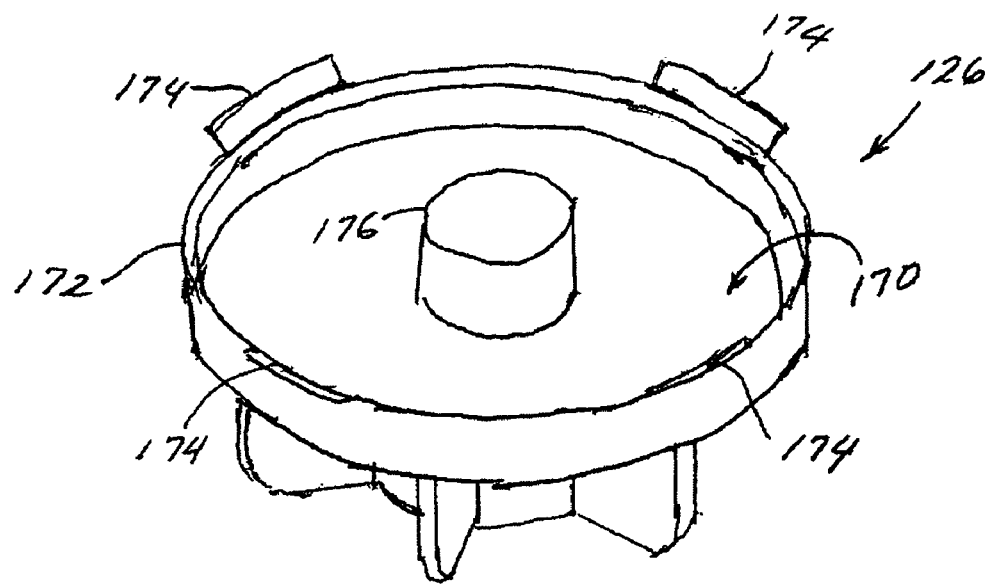
FIG. 6 is a perspective view of an upper side of a bottom end cap of an exemplary filter cartridge.

FIG. 6 illustrates a perspective view of an upper side 170 of bottom end cap 126. In the assembled filter cartridge 120, filter media 130 is installed or attached to upper side 170 of bottom end cap 126. Bottom end cap 126 includes a lip 172 having a number of alignment tabs 174 formed thereon. A raised portion 176 is configured to close bottom end 154 of filter outlet channel 134 when filter media 130 is installed on bottom end cap 126. An opposite side of raised portion 176 forms keying receptacle 166.

Figure 7:
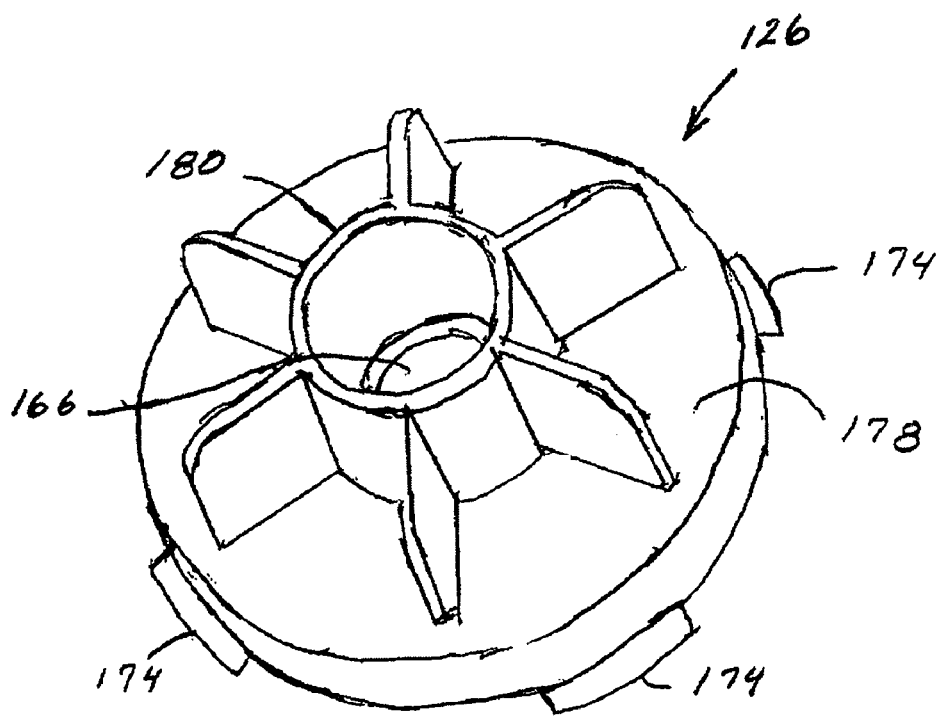
FIG. 7 is a perspective view of the lower side of the bottom end cap shown in FIG. 6.

FIG. 7 is a perspective view of the lower side 178 of bottom end cap 126. In an exemplary embodiment, bottom end cap 126 includes a raised cylinder 180 that partially extends over stand pipe 160 (FIG. 5). Keying receptacle 166 is within cylinder 180 and extends beyond lower side 178. Alignment tabs 174 engage an inner wall 184 of sump 50 to facilitate vertical positioning of filter cartridge 120 within sump 50. Alignment tabs 174 cooperate with keying element 164 to facilitate proper positioning of filter cartridge 120 within sump 50 such that top end cap 124 is positioned so that seal 150 engages sealing flange 152 thus preventing unfiltered water from entering filter outlet 112.

Figure 8:
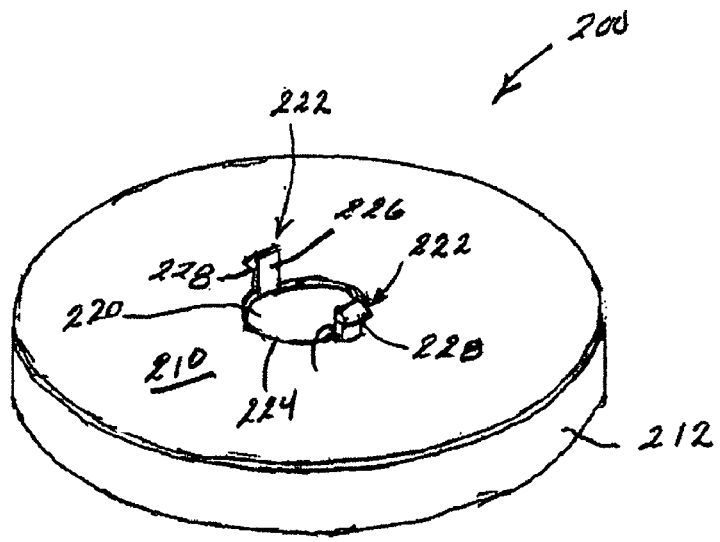
FIG. 8 is a perspective view of an alternative embodiment of a top end cap.
Figure 9:
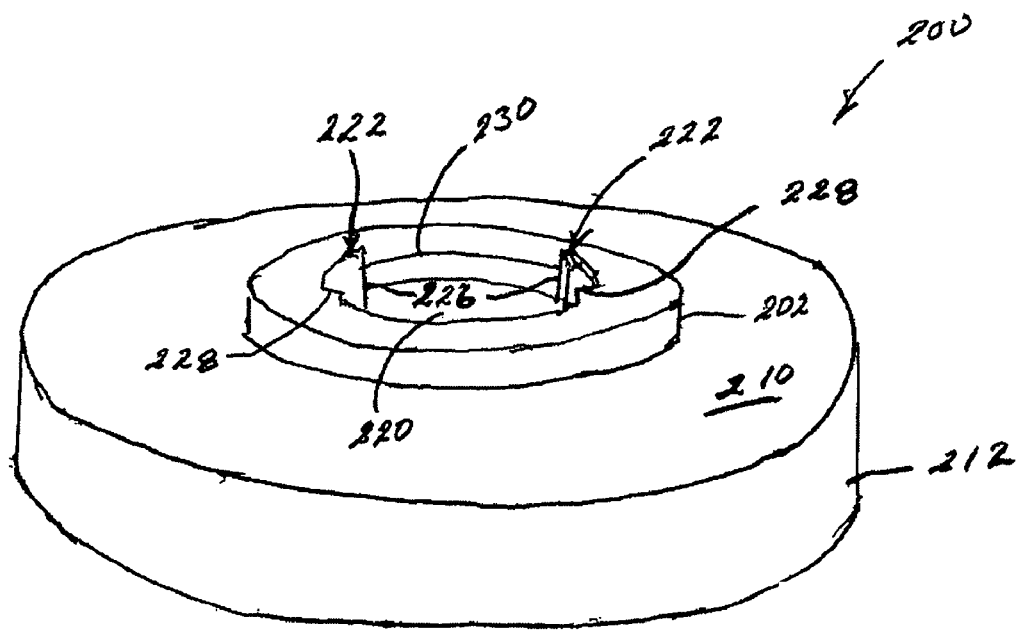
FIG. 9 is a perspective view of the top end cap shown in FIG. 8 with a seal installed thereon.

FIG. 8 illustrates a perspective view of an alternative embodiment of a top end cap 200. FIG. 9 illustrates a perspective view of top end cap 200 with a seal 202 installed thereon. Top end cap 200 includes an upper surface 210 and a rim 212. Seal 202 is installed on upper surface 202 and is positioned to engage sealing flange 152 on filter head 102 (FIG. 5). Rim 212 is sized to be received over and be coupled to an upper end of filter media (FIG. 5) to form an upper end of a filter cartridge (not shown). Top end cap 200 defines an interior opening 220. A pair of seal retaining members 222 are located at an outer perimeter 224 of interior opening 220. Each seal retaining member includes lever portion 226 and a retaining lip 228 formed proximate an end of the lever portion 226. As illustrated in FIG. 9, when seal 202 is installed on upper surface 210 retaining lips 228 extend over an edge 230 of seal 202 to retain seal 202 on upper surface 210 of top end cap 200.

In operation, filter cartridge 120 is replaced by first separating sump 50 from filter head 102. When removed, sump 50 is typically filled with water. Compartment 44 captures water spilled from filter sump 50. Water spilled is then channeled from compartment 44 into brine tank 56 via drain lines 72. As a result, minimal water is spilled outside of water treatment assembly 10 during the filter change. Typical filter cartridges tend to float in the water-filled sump. With filter cartridge 120, alignment tabs 174 engage inner wall 184 of sump 50 to resist cartridge float. When cartridge 120 is fully inserted in sump 50, keying element 164 is received in keying receptacle 166 to position filter cartridge 120 in sump 50 while sump 50 is reinstalled in filter head 102.

The above-described filter assembly provides a cost-effective and reliable apparatus for water filtration. The assembly includes a sump and filter cartridge that cooperate to facilitate proper installation of the filter cartridge in the sump. The filter cartridge can only be installed one way. The sump includes a keying element and the filter cartridge includes alignment tabs that cooperate properly position the filter cartridge in the sump thereby facilitating optimal performance of the filter assembly. The filter cartridge may also be used with sumps not having the keying feature.

Exemplary embodiments of a water filter assembly are described above in detail. The components of the filter assembly are not limited to the specific embodiments described herein, but rather may be utilized independently and separately from other components described herein. Each component can also be used in combination with other water filter assemblies.

While the invention has been described in terms of various specific embodiments, those skilled in the art will recognize that the invention can be practiced with modification within the spirit and scope of the claims.

What is claimed is:

1. A filter cartridge for use in a fluid filtration system including a sump coupled to a filter head, said filter cartridge comprising:
    a top end cap and a bottom end cap spaced apart from said top end cap, said bottom end cap comprising a lip that extends upwardly from said bottom end cap towards said top end cap, said lip comprising at least one alignment tab extending radially outward from a top edge of said lip such that a radially outer edge of said at least one alignment tab is configured to engage an inner side wall of said sump to facilitate a vertical positioning of said filter cartridge;
    a filter media disposed between said top end cap and said bottom end cap; and
    a filter outlet channel defined within said filter media and extending between said top end cap and said bottom end cap, said filter outlet channel including an open top end proximate said top end cap and a closed bottom end proximate said bottom end cap.

2. A filter cartridge in accordance with claim 1 wherein said top end cap includes at least one retaining member configured to retain a seal on said top end cap.

3. A filter cartridge in accordance with claim 1 wherein said bottom end cap is free of a seal.

4. A filter cartridge in accordance with claim 1 wherein said filter media is configured for one of particulate removal, taste and odor improvement, and lead and mercury removal.

5. A filter cartridge in accordance with claim 1 wherein said top end cap includes a seal configured to engage a sealing flange on the filter head.

6. A filter cartridge in accordance with claim 1 wherein said open top end of said filter outlet channel is in flow communication with the filter head.

7. A filter cartridge for use in a fluid filtration system including a sump coupled to a filter head, said filter cartridge comprising:
    a top end cap and a bottom end cap spaced apart from said top end cap, said bottom end cap comprising a lip that extends upwardly from said bottom end cap towards said top end cap and at least one alignment tab that extends radially outward from a top edge of said lip such that a radially outer edge of said at least one alignment tab is configured to engage an inner side wall of said sump to facilitate a vertical positioning of said filter cartridge;

a filter media disposed between said top end cap and said bottom end cap; and a keying receptacle on said bottom end cap, said keying receptacle configured to receive a keying element on the sump.

8. A filter cartridge in accordance with claim 7 further comprising a filter outlet channel defined within said filter media and extending between said top end cap and said bottom end cap, said filter outlet channel including an open top end proximate said top end cap and a closed bottom end proximate said bottom end cap.

9. A filter cartridge in accordance with claim 7 wherein said bottom end cap is free of a seal.

10. A filter cartridge in accordance with claim 7 wherein said filter media is configured for one of particulate removal, taste and odor improvement, and lead and mercury removal.

11. A filter cartridge in accordance with claim 7 wherein said top end cap includes a seal configured to engage a sealing flange on the filter head.

12. A water filtration assembly configured for attachment to a filter head, said water filtration assembly comprising:

a sump configured for attachment to the filter head; and a filter cartridge receivable in said sump, said filter cartridge comprising:

a top end cap and a bottom end cap spaced apart from said top end cap, said bottom end cap comprising a lip that extends upwardly from said bottom end cap towards said top end cap and at least one alignment tab that extends radially outward from a top edge of said lip such that a radially outer edge of said at least one alignment tab is configured to engage an inner side wall of said sump to facilitate a vertical positioning of said filter cartridge;

a filter media disposed between said top end cap and said bottom end cap; and a filter outlet channel defined within said filter media, said filter outlet channel including an open top end proximate said top end cap and a closed bottom end proximate said bottom end cap.

13. A water filtration assembly in accordance with claim 12 wherein said bottom end cap includes a keying receptacle and said sump includes a keying element receivable in said keying receptacle.

14. A water filtration assembly in accordance with claim 12 wherein said bottom end cap is free of a seal.

15. A water filtration assembly in accordance with claim 12 wherein said filter media is configured for one of particulate removal, taste and odor improvement, and lead and mercury removal.

\* \* \* \* \*